Patented Oct. 4, 1932

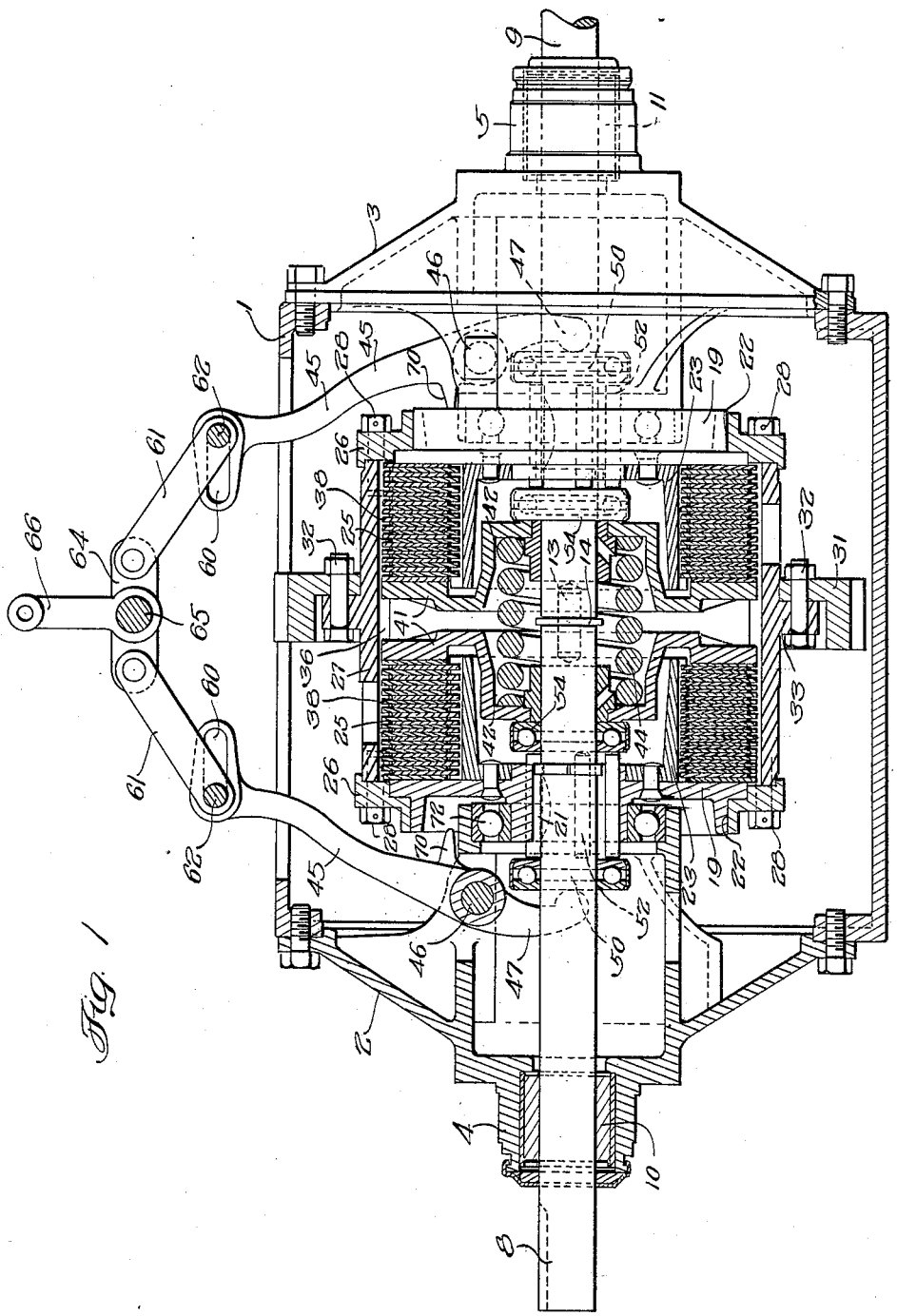

1,880,344

UNITED STATES PATENT OFFICE

JOHN S. FRANCO, OF MILWAUKEE, WISCONSIN

DRIVING CLUTCH FOR TRACKLAYING TRACTORS

Application filed October 12, 1929. Serial No. 399,215.

This invention relates to clutches and particularly to driving clutches for track laying tractors or other similar vehicles where it is desired to operate one driving element or another or both, such as, for example, is necessary where the vehicle is steered by operating at will one of the driving elements while the other element is stationary and does not receive power.

Tractors of the track laying type are generally called upon to draw fairly heavy loads, and in cases where the tractor is steered by holding one of the tracks stationary while the other track receives the entire drive it will been seen that the driving mechanism for the other track is subjected to considerably increased stresses, as compared to the conditions under which the driving mechanism for each track operates when the vehicle is moving forward in a straight line.

It is usual to connect each of the driving mechanisms to the source of power on the tractor by some form of friction clutch device. Thus, when moving forward in a straight line each clutch transmits only approximately half of the required tractive effort, whereas in turning the majority and sometimes all of the tractive effort is transmitted through one clutch.

It is one object, therefore, of my invention to provide an improved form of clutch for tractors wherein the above disadvantages are obviated by the provision of means for increasing the pressure on the clutch which is called upon to transmit the greater part or all of the driving force. Another object of my invention is to provide a clutch mechanism wherein when one clutch is released the pressure on the other clutch is increased. A still further object of my invention is to provide an improved form of clutch releasing mechanism whereby either or both of the clutches may be released.

Other objects and advantages of my invention will be apparent to those skilled in the art after a consideration of the following detailed description, taken in conjunction with the accompanying drawing wherein one preferred embodiment is illustrated and in which the figure is a vertical section and shows all parts in operative position.

The numeral 1 indicates as a whole the enclosing housing for the operative parts of my device. The ends of the housing 1 are closed by castings 2 and 3 which are formed to provide bearing portions 4 and 5.

A pair of shafts 8 and 9 are rotatably mounted, as by roller bearing assemblies, 10 and 11, within the bearing portions 4 and 5. The inner ends of the shafts 8 and 9 are mounted coaxially in end to end relationship and are held in that position by a pin 13 and a thrust washer 14.

Each of the shafts is provided with a disc 19 secured thereto adjacent the inner end, as by a key 21, which disc is provided with a peripheral flange 22 and a drum 23 secured to the disc as by riveting. The drum 23 forms the driven element of a friction clutch of the conventional type and, as is usual in such clutches, is provided with a toothed peripheral surface whereby to receive the driven friction plates 25. A ring 26 is received upon the peripheral flange 22 of each of the discs 19, and a cage member 27 is fixedly secured to the rings 26 by stud bolts 28. A ring gear 31 is secured to the cage 27, as by bolts 32 passing through the ring gear 31 and an annular projection 33 carried by the cage 27. The ring gear 31 is adapted to be driven by the motor of a tractor, the connections from the motor to the ring gear 31 not being a part of my invention I have not illustrated the same. The inner surface of the cage member 27 is provided with a series of teeth 36 adapted to receive the driving set 38 of clutch plates, the plates of the driving set being arranged alternately with the plates 25 of the driven set, as is well known. It will be observed that the rings 26 are rotatably mounted on the discs 19 so that the ring gear 31, cage member 27, rings 26, and driving clutch plates 38 form the driving means or elements in my improved clutch construction.

The adjacent inner ends of the driven shafts 8 and 9 each carry, loosely mounted thereon, a pressure plate 41 adapted when pressed outwardly to force the driving and driven clutch plates in driving engagement whereby the shafts 8 and 9 are respectively driven. From the figure it will be observed that each of the pressure plates 41 is provided with an outwardly extending recess 42. A compression spring 44 surrounds the inner ends of the driven shafts 8 and 9 and has its ends received respectively within the recesses 42. Thus, the outward force exerted by the spring 44 is operative to move both pressure plates 41 outwardly whereby to drive both of the shafts 8 and 9. In effect, therefore, I provide a clutch for each of the shafts 8 and 9 so constructed and arranged that the respective driving and driven clutch plates are pressed into driving engagement by the same spring means.

As will be understood, moving either of the pressure plates 41 inwardly will serve to release the corresponding clutch. I will now describe the means I have provided to release the clutches. A lever 45 is pivoted by a bolt 46 to each of the castings 2 and 3.

Each lever 45 is provided with an inner bifurcated end 47, the arms of which extend on either side of the shafts, respectively, and are adapted to bear against thrust bearings 50. Extending inwardly from each of the thrust bearings 50 are a number of pins 52, which pins pass through apertures in the discs 19 and contact at their inner ends with thrust bearings 54, the latter being carried in contact with the pressure plates 41, as shown in the drawing. Thus, when either of the levers 45 is rocked outwardly the bifurcated inner end 47 bears against the thrust bearing 50 which in turn causes the pins 52 to bear against the inner thrust bearing 54, whereby the pressure plate 41 is moved against the action of the spring 44 and the corresponding clutch released. Attention is particularly directed to the fact that when either of the pressure plates 41 is moved inwardly against the force of the spring 44 the other pressure plate is thereby forced outwardly with an increased pressure. This construction is particularly advantageous in track laying tractors where at times one of the driving means is released so that the entire drive is transmitted through the other driving means. By my construction, therefore, whenever the drive is to be transmitted through one driving means the pressure on the clutch of that driving means is materially increased so that there is little likelihood of the clutch slipping.

From the drawing it will be observed that the outer end of each of the levers 45 extends upwardly beyond the housing 1 and is slotted as at 60. Links 61, each having a pin 62 received within the slots 60, serve to connect the outer ends of the levers 45 with the operating member 64. The operating member 64 is adapted to be rotated by a shaft 65 provided with a handle 66 and which is so spaced with relation to the outer ends of the levers 45 that the pins 62 of the links 61 are each adapted to normally remain at the outer end of the slot 60. Thus rotation of the member 64 through a small angle will operate to cause one of the levers 45 to be rocked outwardly, the pin 62 of the opposite link 61 merely sliding inwardly of the slot 60 whereby to allow the rotation of the member 64 is that direction. Downward bodily movement of the shaft 65 will cause the links 61 to spread outwardly thereby rocking both of the levers 45 and simultaneously releasing the clutches associated with each of the driven shafts 8 and 9.

In order to limit the inward movement of the outer ends of the levers 45, I provide each with an inwardly extending lug 70 adapted to abut against a portion of the end casting. This portion of the casting may also be provided with roller bearings 72 to aid in supporting the discs 19 and the inner ends of the shafts 8 and 9.

Having thus described my invention what I claim and desire to secure by Letters Patent is:

1. A clutch mechanism comprising, in combination, a housing including end members having bearing means thereon, a pair of shafts respectively journaled in said bearing means, said end members having inwardly directed portions co-axially arranged with respect to said shafts, bearings on said inwardly directed portions, a cylindrical clutch driving member journaled in the housing, clutch driven members, one secured to each of said shafts and each having a flange extending within said bearings whereby the inner ends of said shafts are supported, and controlled means respectively connecting said driven clutch members to said driving member.

2. A clutch mechanism comprising, in combination, a housing including end members having bearing means thereon, a pair of shafts respectively journaled in said bearing means, said end members having inwardly directed portions co-axially arranged with respect to said shafts, bearings on said inwardly directed portions, a cylindrical clutch driving member journaled in the housing, clutch driven members, one secured to each of said shafts and each having a flange extending within said bearings whereby the inner ends of said shafts are supported, sets of driving and driven clutch discs operatively connecting the driven clutch members with said driving member, clutch plates loosely mounted on adjacent ends of said shafts and bearing against said discs, and means including a plurality of pins extending through apertures in said clutch driven members from outside said cylindrical clutch driving member to the inside thereof for controlling said clutch plates.

3. A clutch mechanism comprising, in combination, a housing including end members having bearing means thereon, a pair of shafts respectively journaled in said bearing means, said end members having inwardly directed portions co-axially arranged with respect to said shafts, bearings on said inwardly directed portions, a cylindrical clutch driving member journaled in the housing, clutch driven members, one secured to each of said shafts and each having a flange extending within said bearings whereby the inner ends of said shafts are supported, sets of driving and driven clutch discs operatively connecting the driven clutch members with said driving member, clutch plates journaled on adjacent ends of said shafts and bearing against said clutch discs, means including a plurality of pins extending through apertures in said clutch driven members from outside said cylindrical clutch driving member to the inside thereof for controlling said clutch plates, and levers swiveled on said inwardly directed portions of the housing for moving said pins.

In witness whereof, I hereunto subscribe my name this 11th day of October, 1929.

JOHN S. FRANCO.